United States Patent [19]

Horie

[11] Patent Number: 5,392,269
[45] Date of Patent: Feb. 21, 1995

[54] MEDIUM REPLACEABLE RECORDING AND REPRODUCING APPARATUS IN WHICH FULL INITIALIZATION IS NOT NEEDED DEPENDING ON THE INSERTED STATE OF THE MEDIUM

[75] Inventor: Yuji Horie, Tokyo, Japan

[73] Assignee: Olympus Optical Co., Ltd., Tokyo, Japan

[21] Appl. No.: 103,105

[22] Filed: Aug. 9, 1993

[30] Foreign Application Priority Data

Aug. 19, 1992 [JP] Japan .................................. 4-220481

[51] Int. Cl.⁶ .................................................. G11B 7/00
[52] U.S. Cl. .................................. 369/54; 369/116
[58] Field of Search ............................ 369/47–48, 369/50, 53, 54, 58, 116; 360/69, 71, 99.02, 99.06, 99.07, 105; 235/454, 456, 475–476

[56] References Cited

U.S. PATENT DOCUMENTS

| 5,023,854 | 6/1991 | Satoh et al. ............ | 369/54 X |
| 5,155,719 | 10/1992 | Masakawa ............... | 369/54 X |
| 5,173,892 | 12/1992 | Yamada ................... | 369/54 X |
| 5,177,728 | 1/1993 | Otsubo et al. ........... | 369/58 X |
| 5,274,621 | 12/1993 | Akatsuka ................ | 369/54 X |
| 5,289,451 | 2/1994 | Ashinuma et al. ....... | 369/54 X |

FOREIGN PATENT DOCUMENTS 4-10276 1/1992 Japan .

OTHER PUBLICATIONS

Patent Abstracts of Japan, vol. 12, No. 210, [P717], Jun. 16, 1988, & JP 63-9088.

*Primary Examiner*—W. R. Young
*Attorney, Agent, or Firm*—Armstrong, Westerman, Hattori, McLeland & Naughton

[57] ABSTRACT

A medium replaceable recording and reproducing apparatus comprises a medium insertion detecting unit for detecting that at least a part of a recording medium is inserted into a recording and reproducing apparatus for the recording medium, a drive loading detecting unit for detecting that the recording medium is loaded onto medium driver for driving the recording medium, and a medium discriminating unit for monitoring an output of the medium insertion detecting unit, and discriminating whether a recording medium loaded onto the medium driver is a new one or the same reloaded one as loaded just before.

12 Claims, 8 Drawing Sheets

MEDIUM REPLACEABLE RECORDING AND REPRODUCING APPARATUS IN WHICH FULL INITIALIZATION IS NOT NEEDED DEPENDING ON THE INSERTED STATE OF THE MEDIUM

BACKGROUND OF THE INVENTION

1. Field of the Invention

The present invention relates to a medium replaceable recording and reproducing apparatus in which recording and/or reproducing is made on a replaceable recording medium such as a floppy disk, an optical disk, or a detachable hard disk.

2. Description of the Related Art

In a medium replaceable recording and reproducing apparatus, when a recording medium is inserted and a state capable of recording/reproducing is established, the apparatus is subjected to initialization. In the case of an optical disk apparatus, for example, when an optical disk is loaded onto a spindle motor, a process of initializing a drive (such as start-up of the spindle motor, lighting-up of a laser and pull-in to focus tracking servo) and a process of initializing a controller (such as determination of medium type, maker, etc. and setting of recording power and reproducing power of the laser, etc.) are performed regardless of whether the loaded optical disk is a newly-loaded medium or a previously loaded medium which has remained inserted and simply reloaded.

In such a recording and reproducing apparatus, however, when recording/reproducing is not made on a recording medium for a long period of time, there has been often implemented an operation of stopping a spindle motor as medium driving means, unloading the recording medium from the spindle motor for retreatment, or ejecting the recording medium upon a user depressing an eject button (i.e., unloading the recording medium from the spindle motor and making it exposed to a removable position) for the purpose of reducing power consumption or preventing damage of the medium and the apparatus due to head crash, etc.

Because whether or not a recording medium has been replaced cannot be discriminated in the above case, it is necessary to check attributes of the recording medium at the time of starting the apparatus again to perform such an operation as recording/reproducing, meaning that the initialization as mentioned above must be executed for each restart of the apparatus. This has raised the problem that reading/writing of data cannot be promptly processed because of the time necessary for the initialization to be executed prior to start of the operation such as recording/reproducing.

Therefore, Japanese Patent Laid-Open No. 4-10276 discloses an apparatus of a type for detecting a loading-/unloading operation of a recording medium onto a spindle motor even during stoppage of the spindle motor, and for omitting a part of the process required to restart operation of the spindle motor when the recording medium has not been unloaded from the spindle motor.

With the above disclosed apparatus, the loading and unloading operation of the recording medium onto the spindle motor can be detected and, when the recording medium has not been unloaded from the spindle motor, a part of the process required to restart operation of the spindle motor is omitted, making it possible to shorten the time necessary for the initialization and promptly restart such an operation as recording/reproducing.

In the above disclosed apparatus, however, once the recording medium is unloaded from the spindle motor, whether or not a recording medium has been replaced cannot be discriminated. Thus, even when the recording medium is loaded onto the spindle motor again, the usual initialization is executed and, therefore, the time required to reach a state capable of recording/reproducing on the medium cannot be shortened.

SUMMARY OF THE INVENTION

An object of the present invention is to provide a medium replaceable recording and reproducing apparatus which can discriminate whether a recording medium is the same one or not depending on an inserted condition of the recording medium into the apparatus regardless of a loaded condition of the recording medium onto medium driving means, and can shorten the time required to reach a state capable of such an operation as recording/reproducing.

Another object of the present invention is to provide a medium replaceable recording and reproducing apparatus which can discriminate whether the same recording medium is reloaded or not depending on an inserted condition of the recording medium into the apparatus regardless of a loaded condition of the recording medium onto medium driving means, and can thereby omit a part of the process for initializing the apparatus in relation to the recording medium, shorten a response time to commands from host control means, and further promptly start a process such as recording/reproducing.

A medium replaceable recording and reproducing apparatus according to the present invention comprises medium insertion detecting means for detecting that at least a part of a recording medium is inserted into a recording and reproducing apparatus of the recording medium, drive-means loading detecting means for detecting that the recording medium is loaded onto medium driving means for driving the recording medium, and medium discriminating means for monitoring an output of the medium insertion detecting means, and discriminating whether a recording medium loaded onto the medium driving means is a new one or a previously loaded one which has remained inserted and reloaded.

Other features and advantages of the present invention will be sufficiently apparent from the following description.

BRIEF DESCRIPTION OF THE DRAWINGS

FIG. 1 is an explanatory view showing a construction of an optical disk apparatus, FIG. 2 is a block diagram showing a functional construction of the optical disk apparatus according to the first embodiment, and FIG. 3 is a flowchart showing operation of the first embodiment.

FIG. 5 is a block diagram showing a functional construction of an optical disk apparatus, FIG. 6 is a flowchart showing operation of a second control unit in FIG. 5, and FIG. 7 is a flowchart showing operation of a first control unit in FIG. 5.

DETAILED DESCRIPTION OF THE PREFERRED EMBODIMENTS

Figure 1:
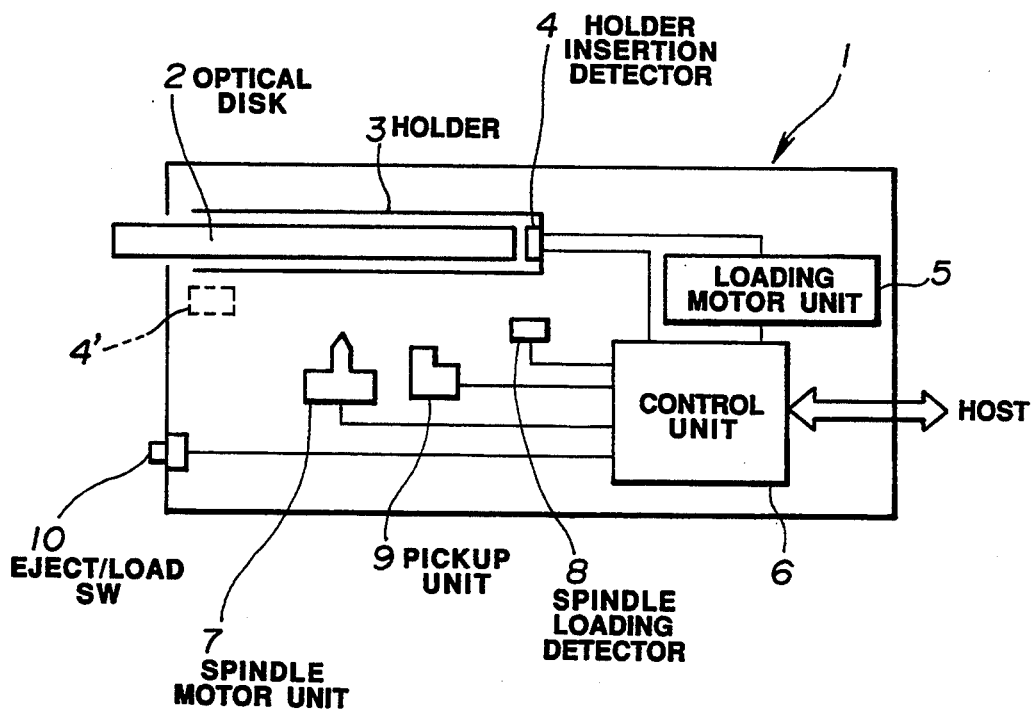
FIGS. 1 to 3 are concerned with a first embodiment of the present invention.
Figure 2:
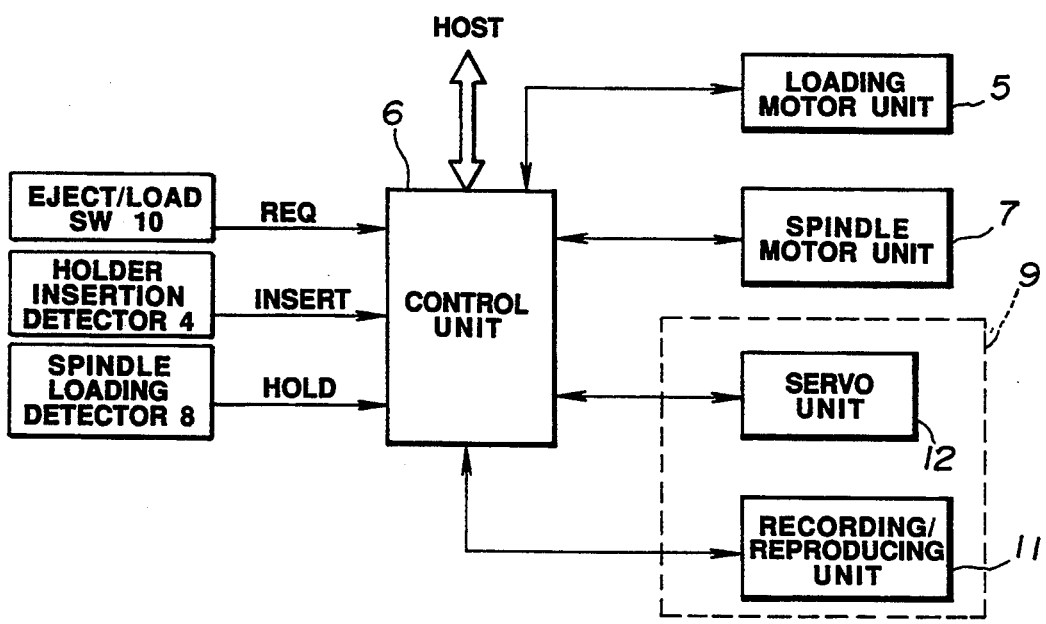
Figure 3:
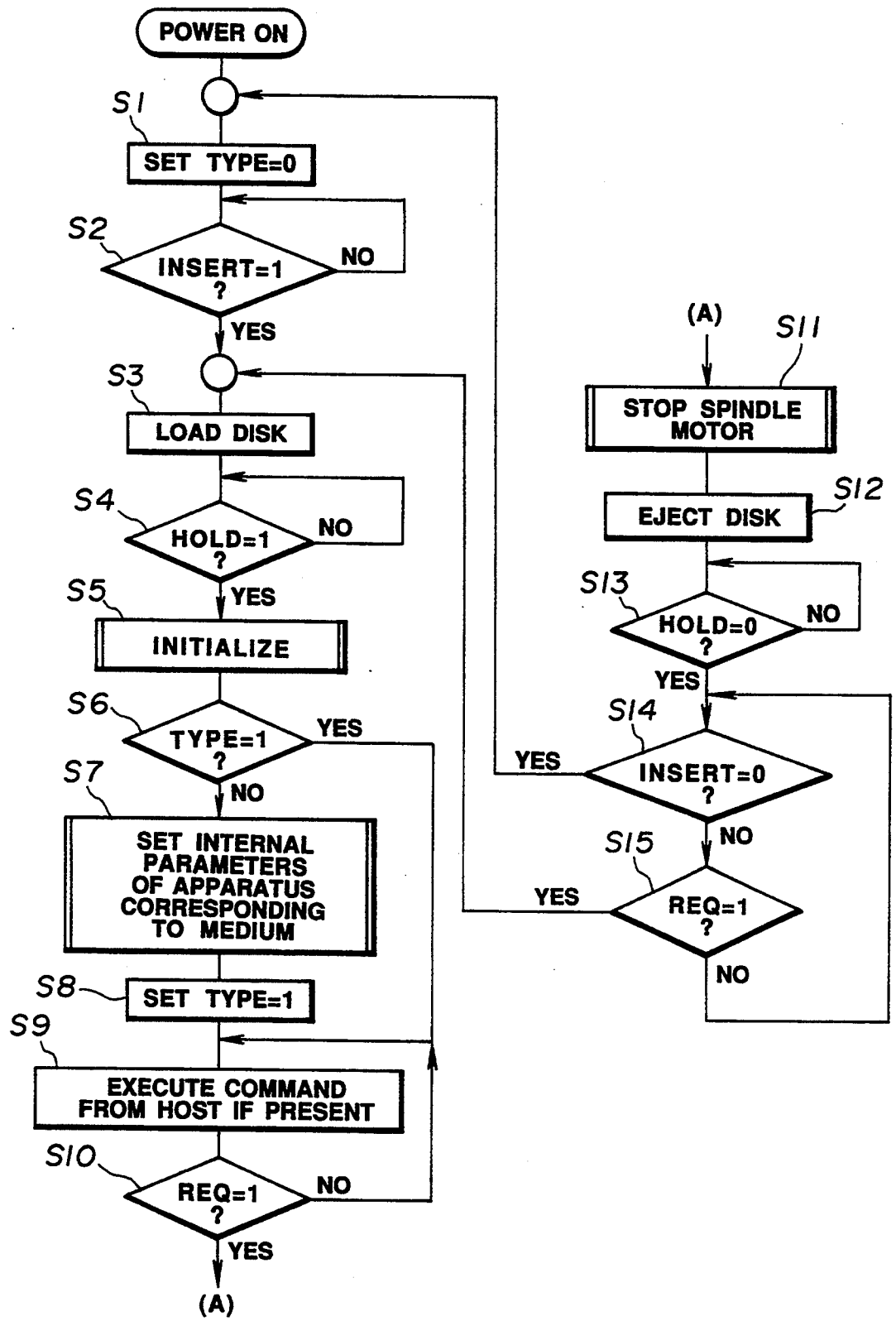

A first embodiment of the present invention is shown in FIGS. 1 to 3.

This embodiment represents one example of an optical disk apparatus in which an optical disk is used as a recording medium.

As shown in FIG. 1, an optical disk apparatus 1 has a holder 3 for holding an optical disk 2 therein, and the optical disk 2 being transferred within the apparatus under a condition that it remains inserted in the holder 3. At an innermost end of the holder 3, there is disposed a holder insertion detector 4 as medium insertion detecting means which serves to detect whether or not the optical disk 2 is inserted into the holder 3.

Connected to the holder 3 is a loading motor unit 5 which serves to attach and detach the holder 3 to and from a spindle motor unit 7 in response to an instruction from a control unit 6. The spindle motor unit 7 as medium driving means serves to receive the optical disk 2 inserted in the holder 3 for rotating the optical disk 2 in a loaded condition, and is driven to rotate upon an instruction from the control unit 6.

Near the spindle motor unit 7, there is disposed a spindle loading detector 8 as drive-means loading detecting means which serves to detect whether the optical disk 2 in the holder 3 is loaded onto the spindle motor unit 7 or not. The holder insertion detector 4 and the spindle loading detector 8 are both connected to the control unit 6 as medium discriminating means. The control unit 6 monitors an inserted condition of the optical disk 2 into the holder 3 and a loaded condition of the optical disk 2 onto the spindle motor unit 7 for thereby discriminating whether the optical disk 2 loaded onto the spindle motor unit 7 is a new one or a previously loaded one which has remained inserted.

A pickup unit 9 is also disposed to perform a seek to the target area, recording/reproducing, etc. on the optical disk 2 under control of the control unit 6 as operation control means.

Further, an eject/load switch (SW) 10 is disposed for instructing the optical disk 2 to be ejected (i.e., unloaded from the spindle motor and exposed to a removable position) and to be loaded (i.e., taken into the apparatus and loaded onto the spindle motor). Upon the eject/load SW 10 being operated, an eject/load request is delivered to the control unit 6, so that the optical disk 2 is ejected or loaded depending on the current set condition thereof.

Additionally, the holder insertion detector 4 may be disposed near an entrance of the holder 3 as indicated by broken line 4' in FIG. 1. With the holder insertion detector 4' thus disposed, an inserted/non-inserted condition can be detected depending on whether or not even a part of the optical disk 2 is positioned in the holder 3.

The control unit 6 is connected to a host computer which is a host control means through a Small Computer System Interface (SCSI) interface, for example, for executing recording/reproducing in response to a command from the host computer.

Functional construction of the optical disk apparatus 1 such as relating to transmission and reception of signals for various components will be next described with reference to FIG. 2.

The holder insertion detector 4 detects an inserted/non-inserted condition of the optical disk 2 into the holder 3 and delivers an output signal INSERT depending on the detected result to the control unit 6. The output signal INSERT takes a level 1 (INSERT=1) in the inserted condition and a level 0 (INSERT=0) in the non-inserted condition.

The spindle loading detector 8 detects a loaded/unloaded condition of the optical disk 2 onto the spindle motor unit 7 and delivers an output signal HOLD depending on the detected result to the control unit 6. The output signal HOLD takes a level 1 (HOLD=1) in the loaded condition and a level 0 (HOLD=0) in the unloaded condition.

The eject/load SW 10 outputs a signal requesting the optical disk 2 to be ejected/loaded, and delivers an output signal REQ to the control unit 6. in other words, when the eject/load SW 10 is not depressed, REQ=0 holds and, when it is depressed, REQ=1 is output. In response to REQ=1, the control unit 6 controls the loading motor unit 5 to eject or load the optical disk 2 depending on the current set condition of the optical disk 2, i.e., on conditions of INSERT and HOLD.

More specifically, when the optical disk 2 is loaded, i.e., when INSERT=1 and HOLD=1 hold, the loading motor unit 5 is controlled to eject the optical disk 2. Also, when the optical disk 2 is not loaded onto the spindle motor unit 7 but inserted into the holder 3, i.e., when INSERT=1 and HOLD=0 hold, the loading motor unit 5 is controlled to load the optical disk 2 onto the spindle motor unit 7.

When the optical disk 2 is loaded onto the spindle motor unit 7 (i.e., INSERT=1 and HOLD=1), the control unit 6 usually executes initialization as follows.

The control unit 6 controls the spindle motor unit 7 to start up the spindle motor, then controls a recording/reproducing unit 11 in the pickup unit 9 to light up a laser, and further controls a servo unit 12 in the pickup unit 9 to turn on both focus servo and tracking servo. Thereafter, it controls the servo unit 12 for making a seek to the particular area on the optical disk 2 to thereby read required information (maker and type of the disk, etc.) on the disk 2 through the recording/reproducing unit 11 and set reproducing power, recording power, etc. of the laser depending on the medium based on the read information.

After the apparatus is brought into a state capable of recording/reproducing through the above initialization, such an operation as recording/reproducing is started in accordance with a command from the host.

Operation of the optical disk apparatus 1 of the first embodiment thus constructed will now be described with reference to a flowchart of FIG. 3.

In the flowchart of FIG. 3, TYPE is an internal signal indicating whether the optical disk 2 is the same one as previously loaded, i.e., whether or not information on attributes of the disk is already known. In the first embodiment, whether or not the optical disk 2 is the same one as loaded just before is determined by using TYPE.

After turning on a power supply of the apparatus, TYPE=0 is first set in a step S1 (hereinafter referred to simply as S1). In the first cycle of a control flow, because the optical disk 2 is not loaded, attributes of the disk are unknown, which corresponds to TYPE=0. Then, whether or not INSERT=1 holds or not is determined in S2 and this determination will be repeated until the optical disk 2 is inserted into the holder 3. When INSERT=1 holds upon the optical disk 2 being inserted to the holder 3, the control flow goes to S3 for loading the disk, and then to S4 for determining whether or not HOLD=1 holds. This determination will be repeated until the optical disk 2 is loaded onto the spindle motor unit 7.

When HOLD=1 holds upon the optical disk 2 being loaded onto the spindle motor unit 7, the control flow goes to S5 for executing an initialization routine. This initialization routine is a part of the process for initializing the drive (i.e., a predetermined sequence of drive initialization) in which the spindle motor is started up, the laser is lit up, and both the focus servo and the tracking servo are turned on, as mentioned above, thereby enabling read of information on the optical disk 2.

Subsequently, whether TYPE=1 holds or not is determined in S6, and if TYPE=1 does not hold, then the control flow goes to S7. Because TYPE=0 holds in the first cycle, the control flow now goes to S7. In S7, a routine for setting internal parameters of the apparatus corresponding to a medium is executed. This internal parameter setting routine is a part of the process for initializing the controller, as mentioned above, in which a seek to the particular area (e.g., the control track) on the optical disk 2 is made, required information (maker and type of the disk, etc.) on the disk is read, and internal parameters corresponding to a medium are set based on the read information. The internal parameters include a rotational speed of the disk, reproducing power, recording power, erasing power, data exchange information, and so on. Thus, for each of loaded media having different parameter values, the internal parameters are set to optimum values. Note that when reading information out of the particular area on the optical disk, the information is reproduced with default parameter values set in advance.

After attributes of the loaded disk are read and the initialization is executed corresponding to the medium in that way, TYPE=1 is set in S8.

In that state, a command from the host is executed in S9, if present. For example, if a command of recording/reproducing is present, a recording/reproducing operation is executed. It is then determined in S10 whether REQ=1 holds or not, i.e., whether an eject/load request is issued or not by the eject/load SW 10 being depressed. If no eject/load request is issued, then the control flow goes back to S9 to repeat an operation of waiting for a command from the host.

If REQ=1 holds in S10 upon an eject/load request being issued, then the control flow goes to S11 following arrow (A) in the flowchart to execute a routine of stopping the spindle motor. In this case, since the optical disk 2 is loaded onto the spindle motor unit 7, the eject operation is executed. In the spindle motor stopping routine, the spindle motor is stopped after ceasing the various functions inside the drive, i.e., turning off the tracking servo and the focus servo and lighting off the laser. Subsequently, the optical disk 2 is ejected in S12 to be exposed to a removable position. On this occasion, whether or not HOLD=0 holds is determined in S13 and this determination will be repeated until the optical disk 2 is unloaded from the spindle motor unit 7.

Thereafter, whether or not INSERT=0 holds is determined in S14. If INSERT=0 holds, i.e., if the optical disk 2 is removed from the holder 3, then the control flow goes back to S1. On the other hand, if INSERT=1 remains held, then it is determined in S15 whether or not REQ=1 holds. If REQ=1 holds, i.e., if an eject/load request is issued, then the control flow goes back to S3 for loading the disk. In the case of INSERT=1 and REQ=0, S14 and S15 are be repeated.

The second and subsequent cycles of the control flow is basically similar to the first cycle. However, when even a part of the optical disk 2 is inserted into the holder 3 and INSERT=1 remains held, the process following S3 is executed with TYPE=1 being maintained. Accordingly, the control flows skips from S6 to S9 because of TYPE=1. In other words, based on the discrimination that the optical disk 2 remains inserted into the holder 3 after the eject operation and the medium is the same as one previously loaded onto the spindle motor unit 7, the routine of setting internal parameters of the apparatus corresponding to a medium in S7 is omitted. Thus, when the same disk as one previously loaded is reloaded, a part of the process for initializing the apparatus can be omitted so that the apparatus directly comes into a state capable of recording/reproducing to execute a recording/reproducing operation in accordance with a command from the host.

With this embodiment, as described above, after the optical disk 2 is once loaded onto the spindle motor 7, it can be discriminated regardless of a loaded or unloaded condition of the disk that the medium is the same one as previously loaded onto the spindle motor unit 7, so long as a non-inserted condition of the disk in the holder 3 is detected by the holder insertion detector 4.

As a result, when the disk loaded onto the spindle motor unit 7 has the same medium as one previously loaded, the apparatus can be controlled by omitting a part or the whole of the initialization in relation to the disk, and a response time to a command from the host can be shortened. Consequently, a waiting time from delivery of a command for recording/reproducing, etc. is reduced to enable quick start of such an operation as recording/reproducing.

Figure 4A:
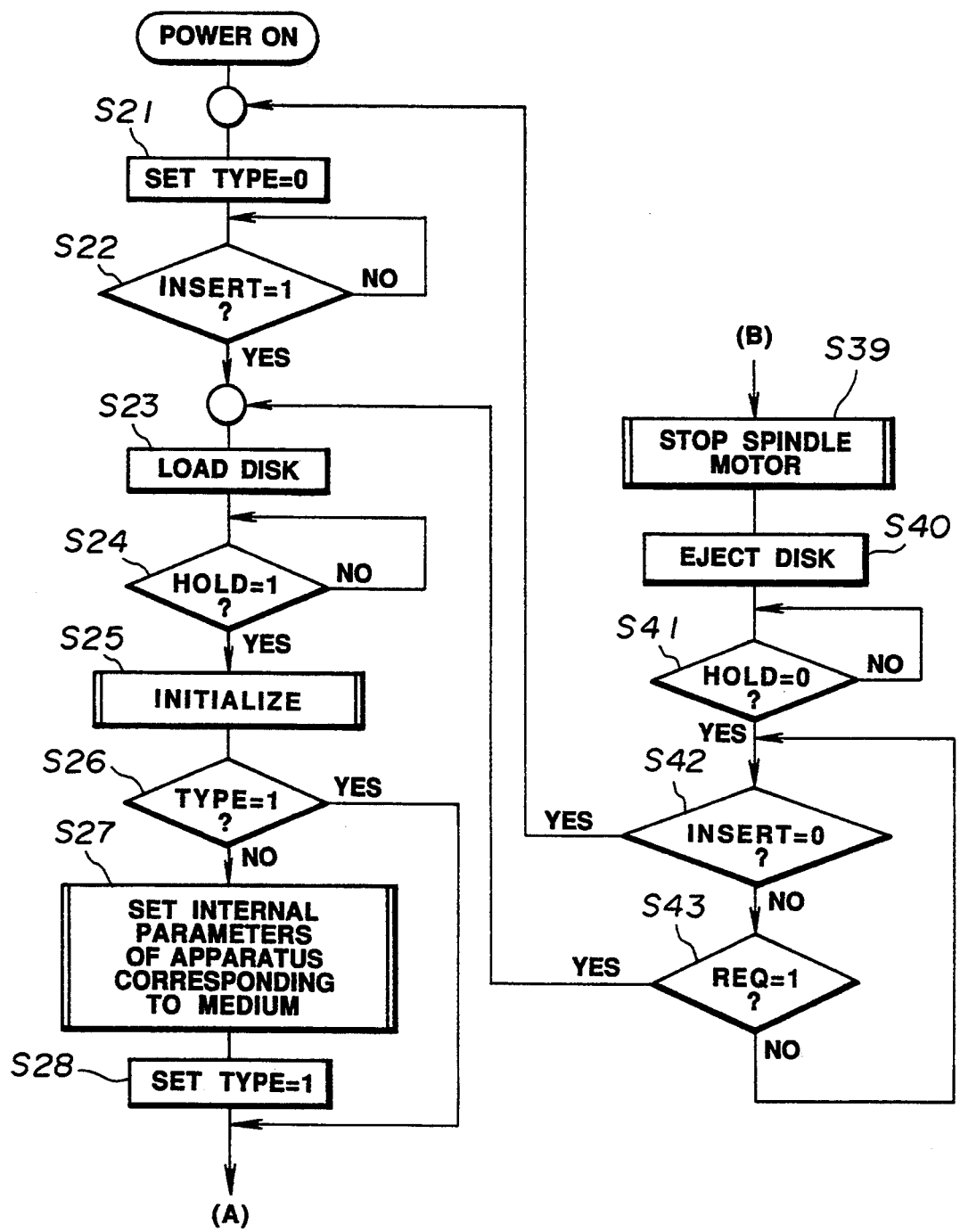
FIG. 4(a, b) is a flowchart showing operation of an optical disk apparatus according to a second embodiment of the present invention.

FIG. 4 is a flowchart showing operation of an optical disk apparatus according to a second embodiment of the present invention.

This second embodiment represents one example of an optical disk apparatus in which the spindle motor is stopped when no commands are issued from the host and recording/reproducing is not executed for a long period of time. Since the apparatus construction is the same as the first embodiment, the following description will be given of only operation with reference to the flowcharts of FIGS. 4(a) and 4(b). In these flowcharts, arrows (A), (B) indicate interconnection between the two flowcharts such that the process flow goes from S28 in FIG. 4(a) to S29 in FIG. 4(b) and also goes from S38 in FIG. 4(b) to S39 in FIG. 4(a).

S21 to S28 after power-on are the same as S1 to S8 in the first embodiment and, therefore, will not be described here.

Figure 4B:
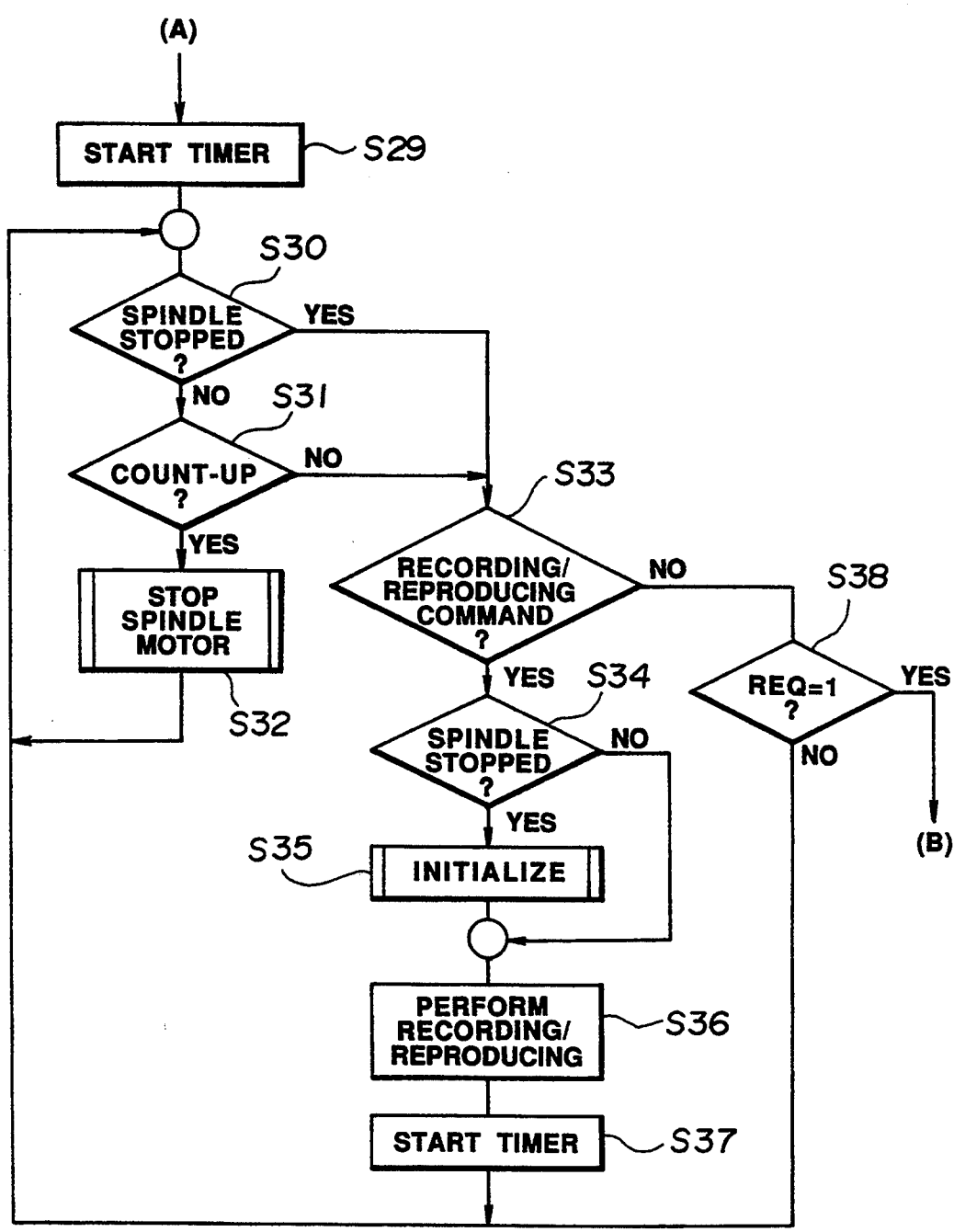

After the apparatus has been started up and brought into a state capable of recording/reproducing, etc. and TYPE=1 has been set in S28, a timer is started up in S29 of FIG. 4(b). This timer serves to measure or count time for stopping the spindle motor when any operation such as recording/reproducing is not performed for a long period of time, and sets a predetermined time when started up. Subsequently, whether the spindle motor is stopped or not is determined in S30. If the spindle motor is not stopped, then the control flow goes to S31 for determining whether or not the timer has counted up. If the timer has counted up in S31, i.e., if the predetermined mime set for stopping the spindle motor has elapsed, then the control flow goes to S32 where a spindle motor stopping routine similar to that in S11 of the first embodiment is executed to stop the spindle motor, followed by going back to S30.

If the spindle motor is stopped in S30, or if the timer has not counted up in S31, then the control flow goes to S32 for determining whether or not the recording/reproducing command is sent from the host. If the recording/reproducing command is sent from the host, then it is determined in S34 whether or not the spindle motor is stopped. If the spindle motor is stopped in S34, then the control flow goes to S35 where an initialization routine similar to that in S5 of the first embodiment is executed, followed by performing recording/reproducing in S36. On the other hand, if the spindle motor is not stopped in S34, then the control flow directly goes to S36 for performing recording/reproducing.

Thus, although the initialization routine is executed to enable recording/reproducing after the spindle motor has been stopped once, the routine of setting internal parameters of the apparatus corresponding to a medium in S7 can be omitted similarly to the first embodiment, because the optical disk 2 remains loaded onto the spindle motor unit 7 and attributes of the disk are known.

After performing recording/reproducing, the timer is started up in S37 similarly to S29, followed by going back to S30.

If the recording/reproducing command is not sent from the host in S33, then the control flow goes to S38 for determining whether REQ=1 holds or not. If REQ=0, i.e., if no eject/load request is issued, then the control flow goes back to S30 for repeating the subsequent process. On the other hand, if REQ=1, i.e., if an eject/load request is issued, then the control flow goes to S39 in FIG. 4(a) where the spindle motor stopping routine is executed to stop the spindle motor.

Subsequent S39 to S43 are the same as S11 to S15 in the first embodiment and, therefore, will not be described here.

In short, similarly to the first embodiment, even when a part of the optical disk 2 is inserted into the holder 3 and INSERT=1 is maintained, TYPE=1 is kept set and the routine of setting internal parameters of the apparatus corresponding to a medium can be omitted upon the optical disk 2 being reloaded onto the spindle motor unit 7.

As described above, in the case that the spindle motor is stopped when recording/reproducing, etc. is not performed for a long period of time, the apparatus can also be controlled by omitting a part or the whole of the initialization in relation to the disk an the time of executing such an operation as recording/reproducing, and the operation such as recording/reproducing can be promptly restarted. Consequently, a waiting time until reaching the state capable of recording/reproducing, etc. can be shortened.

Figure 5:
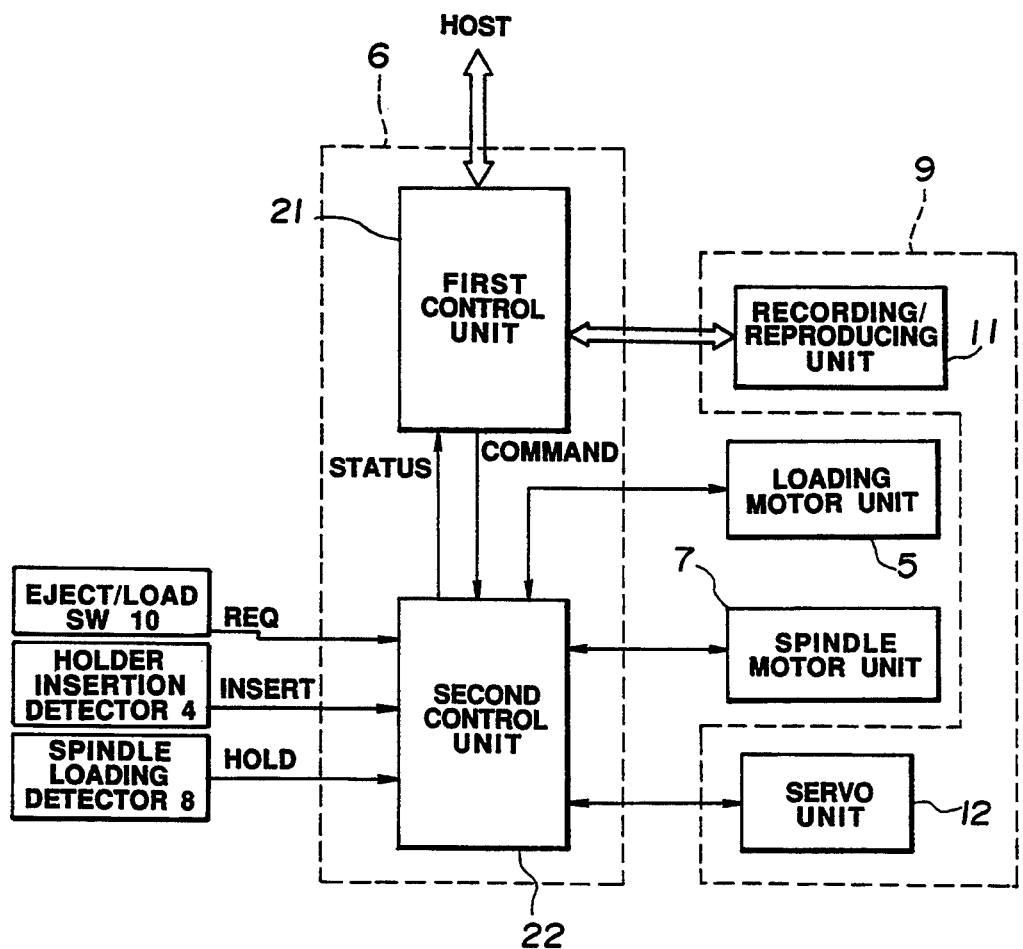
FIGS. 5 to 7 are concerned with a third embodiment of the present invention.
Figure 6:
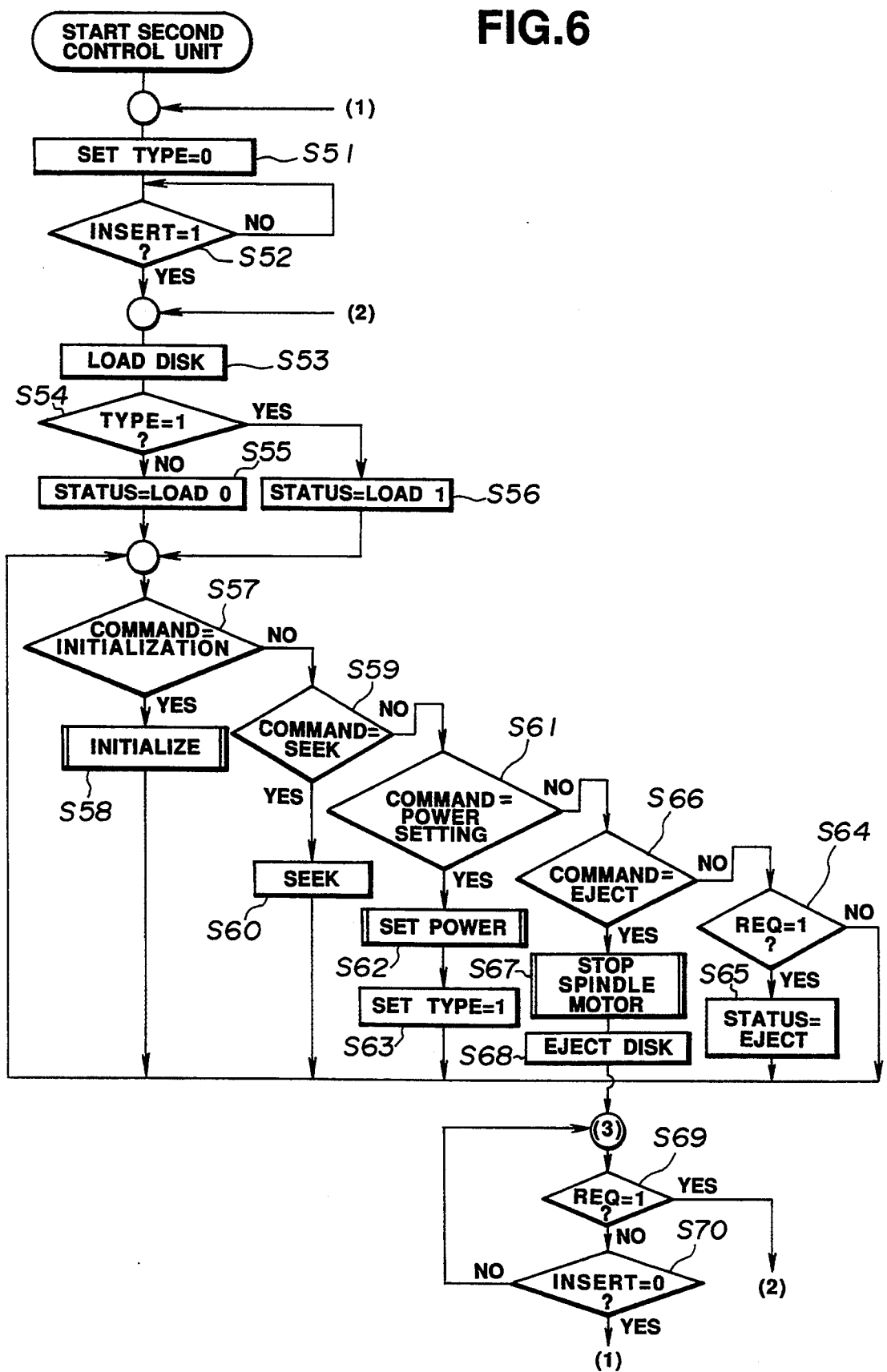
Figure 7:
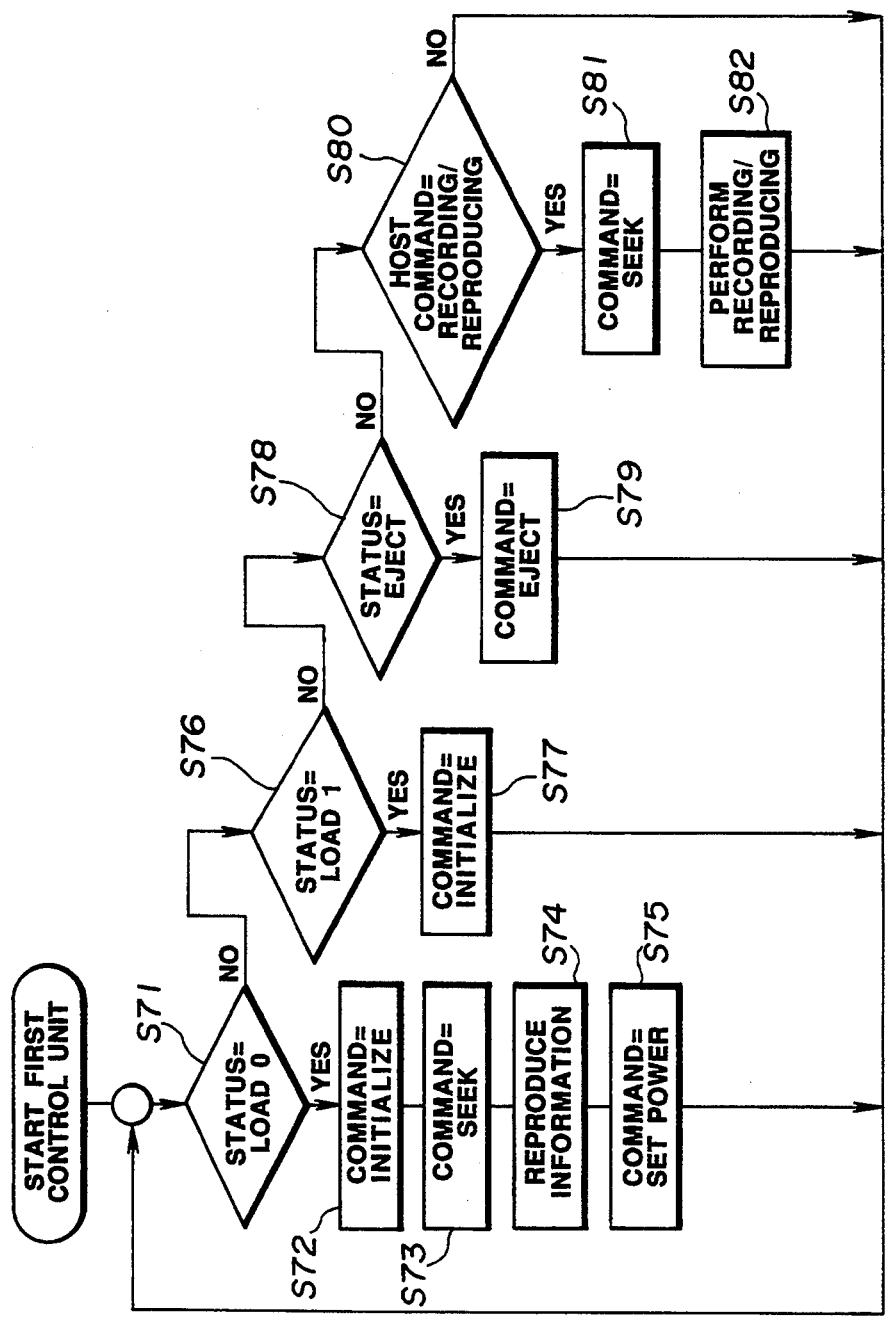

FIGS. 5 to 7 show a third embodiment of the present invention.

The third embodiment represents one example of an optical disk apparatus in which the control unit 6 is divided into two parts. As shown in FIG. 5, the control unit 6 comprises two divided control units; i.e., a first control unit 21 and a second control unit 22. The first control unit 21 is connected to a host computer through an SCSI interface, for example, and serves as an upper-level control unit which delivers commands to the second control unit 22 in accordance with commands from the host computer and signals sent from the second control unit 22. The first control unit 21 is connected to the recording/reproducing unit 11 through an ESDI interface, for example, for processing information signals sent from the host computer to control recording/reproducing.

The second control unit 22 serves to provide control other than the above, and receives the signals INSERT, HOLD and REQ respectively from the holder insertion detector 4, the spindle loading detector 8 and the eject/load SW 10. The second control unit 22 is connected to the first control unit 21 through an ESDI interface, for example, for delivering STATUS (request signal) to the first control unit 21 and receiving COMMAND (command signal) from the first control unit 21. In response to COMMAND from the first control unit 21, the second control unit 22 controls the loading motor unit 5, the spindle motor unit 7 and the servo unit 12. STATUS is a signal indicating a request and, the second control unit 22 is stopped after COMMAND corresponding to the request has been set and the commanded process has been executed.

The remaining is the same as the first embodiment and, therefore, will not be described here.

Operation of the third embodiment will now be described with reference to FIGS. 6 and 7. Note that FIG. 6 shows operation relating to the second control unit 22 and FIG. 7 shows operation relating to the first control unit 21.

After turning on a power supply of the apparatus, TYPE=0 is first set in S51 similarly to the first embodiment. Then, whether or not INSERT=1 holds is determined in S52 and this determination will be repeated until the optical disk 2 is inserted into the holder 3. When INSERT=1 holds upon the optical disk 2 being inserted to the holder 3, the control flow goes to S53 for loading the disk, and then to S54 for determining whether or not TYPE=1 holds.

In this third embodiment, the second control unit 22 outputs STATUS to the first control unit 21 depending on whether TYPE is 0 or 1. More specifically, if TYPE=0 holds in S54, then the control flow goes to S55 for outputting STATUS=load 0. Also, if TYPE=1 holds in S54, then the control flow goes to S56 for outputting STATUS=load 1. After that, the second control unit 22 executes the process subsequent to S57 in response to COMMAND from the first control unit 21. Note that because of TYPE=0 in the first cycle, STATUS=load 0 is output.

On the other hand, the first control unit 21 executes the process subsequent to S71 depending on STATUS from the second control unit 22, as shown in FIG. 7. More specifically, the first control unit 21 determines in S71 whether STATUS=load 0 holds or not and, if STATUS=load 0 holds, then it goes to S72 for outputting COMMAND=initialization and, thereafter, COMMAND=seek in S73. In response to these COMMANDs, the second control unit 22 goes from S57 to S58 for executing an initialization routine similar to S5 in the first embodiment and, thereafter, goes from S59 to S60 for making a seek to the target particular area.

Subsequently, the first control unit 21 reproduces information in the particular area in S74, and outputs COMMAND=power setting in S57, causing the second control unit 22 to make setting of internal parameters corresponding to a medium. Upon COMMAND=power setting being input, the second control unit 22 goes from S61 to S62 for setting the internal parameters, such as recording and reproducing power, corresponding to a medium. This power setting routine in S62 is a part of the routine of setting internal parameters of the apparatus in the first embodiment. After setting the recording and reproducing power, etc., TYPE=1 is set in S63.

If STATUS=load 0 does not hold in S71, then the first control unit 21 goes to S76 for determining whether STATUS=load 1 holds or not. If STATUS=load 1 holds, then it goes to S77 for outputting COMMAND=initialization. In this case, the second control unit 22 executes the initialization routine only.

Further, if STATUS=eject is input in S78, then the first control unit 21 goes to S79 for outputting COMMAND=eject to the second control unit 22. That STATUS=eject is output to the first control unit 21 on condition that the second control unit 22 goes to S65 when REQ=1 holds in S64, i.e., when an eject request is issued.

In addition, if a recording/reproducing command is input from the host in S80, then the first control unit 21 goes to S81 for outputting COMMAND=seek to make a seek to the target track, followed by performing recording/reproducing in S82. Note that when a recording/reproducing command is input from the host as mentioned above, the apparatus has been already brought into a state capable of recording/reproducing upon preceding input of STATUS=load 0 or STATUS=load 1.

When COMMAND=eject is input, the second control unit 22 goes from S66 to S67 for executing the spindle motor stopping routine to stop the spindle motor, and then to S68 for ejecting the optical disk 2. Thereafter, it determines in S69 whether or not REQ=1 holds. If REQ=1 holds, i.e., if an eject/load request is issued, then it goes back to S53 as indicated by (2) for loading the optical disk 2. If REQ=0 holds in S69, then it goes to S70 for determining whether INSERT=0 holds or not. If INSERT=0 holds, i.e., if the optical disk is removed from the holder, then it goes back to S51 as indicated by (1). In the case of REQ=0 and INSERT=1, it goes back to (3) for repeating S69 and S70.

In the second and subsequent cycles of the control flow, when even a part of the optical disk 2 is inserted into the holder 3 and INSERT=1 remains held, TYPE=1 kept set as with the first embodiment and STATUS=load 1 is output. Accordingly, since the first control unit 21 executes the process of S76, S77, the second control unit 22 is commanded to execute the initialization routine only, and the routine of setting internal parameters of the apparatus corresponding to a medium can be omitted.

Thus, similarly to the first embodiment, since it can be discriminated that the same medium as loaded just before is reloaded, it is possible to omit a pare of the process for initializing the apparatus and to shorten the time until reaching a state capable of such an operation as recording/reproducing.

Note that in connection with the process of S53, S68 in FIG. 6, conformation of the HOLD condition shown in FIG. 3 may be added.

Figure 8:
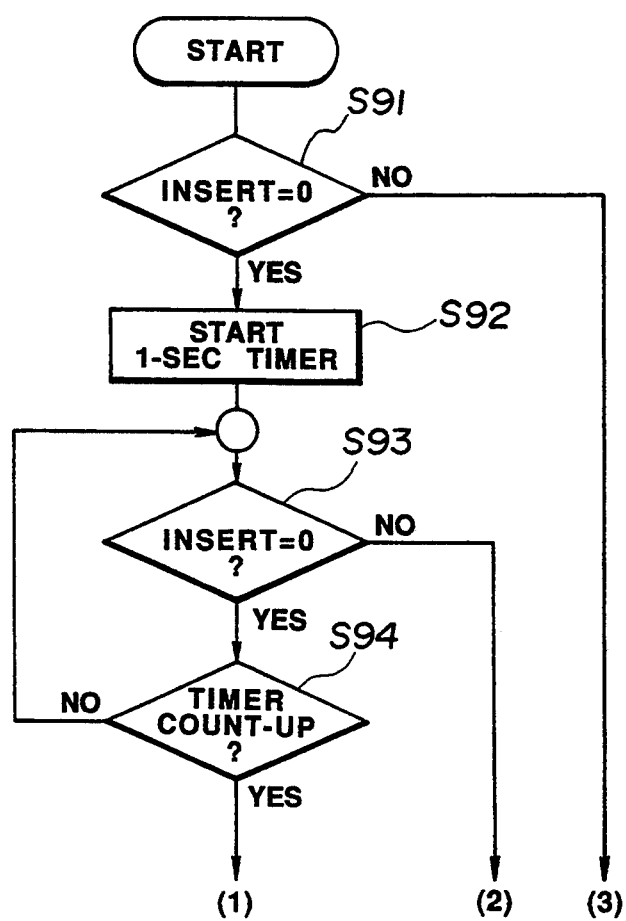
FIG. 8 is a flowchart showing operation of an optical disk apparatus according to a fourth embodiment of the present invention.

FIG. 8 is a flowchart showing operation of an optical disk apparatus according to a fourth embodiment of the present invention.

The fourth embodiment is a modification of the third embodiment, and is modified in the process of S70 in FIG. 6. The remaining is the same as the third embodiment and, therefore, will not be described here.

In the case that the optical disk 2 cannot be loaded upon an eject/load request from the eject/load SW 10 unlike any of the above embodiments, the optical disk 2 is loaded only when INSERT is changed from 0 to 1 upon insertion of the optical disk 2 into the holder 3 being detected.

In that case, even if the optical disk 2 is one which has been once loaded onto the spindle motor unit 7 and subjected to recording/reproducing, the disk is loaded by momentarily removing the ejected optical disk 2 from the holder 3 and then inserting it again.

In any of the above embodiments, however, if the optical disk 2 is removed from the holder 3 even for a moment, TYPE=0 is set and the routine of setting internal parameters of the apparatus corresponding to a medium must be executed again. In view of the above, the fourth embodiment is arranged to discriminate that the same disk as previously loaded is reloaded, and to omit the routine of setting internal parameters of the apparatus corresponding to a medium, on condition that even if INSERT=0 holds for a short period of time (e.g., 1 second) not enough for replacement of the disk, INSERT=1 holds again during the short period of time.

As shown in FIG. 8, whether or not INSERT=0 holds is first determined in S91 and, if INSERT=1 holds, then the control flow goes back to S69 as indicated by (3) for repeating the process. If INSERT=0 holds in S91, then it goes to S92 for starting up a 1-sec timer. Next, whether or not INSERT=0 holds is determined again in S93 and, if INSERT=1 holds, then it goes back to S53 as indicated by (2) for loading the optical disk 2. At this time, TYPE=1 remains held.

On the other hand, if INSERT=0 holds in S93, then the control flow goes back to S94 for determining whether or not the timer has counted up. If the timer has not counted up, then it goes back to S93 for repeating the process. If the timer has counted up in S94, then it goes back to S51 as indicated by (1).

The set time of the timer may be any desired value other than 1 second so long as it is shorter than a minimum time required for removing the optical disk 2 from the holder 3 and inserting another disk.

Thus, even when the optical disk 2 is removed from the holder 3 for a short time, it can be discriminated whether or not the same medium as loaded just before is reloaded, depending on the time of a non-inserted condition, making it possible to omit a part of the process for initializing the apparatus.

Note that the fourth embodiment is also applicable to any of the first and second embodiments.

While the signals INSERT, HOLD and REQ respectively from the holder insertion detector 4, the spindle loading detector 8 and the eject/load SW 10 are always monitored in each of the above embodiments for detecting changes in those signals, such detection may be executed using an interrupt.

According to the present invention, as described above, it can be discriminated whether a recording medium is the same one as previously loaded depending on an inserted condition of the recording medium into the apparatus regardless of a loaded condition of the a recording medium onto a spindle motor, resulting in an advantage of shortening the time required to reach a state capable of such an operation as recording/reproducing.

It is apparent that embodiments of the present invention being different in a wide range of varieties can be practiced based on the above-mentioned teachings of the invention without departing from the spirit and scope of the invention. The present invention is not restricted by any particular embodiments other than being limited by the attached claims.

What is claimed is:

1. A medium replaceable recording and reproducing apparatus comprising:

medium insertion detecting means for detecting that at least a part of a recording medium is inserted into a recording and reproducing apparatus of said recording medium, drive-means loading detecting means for detecting that said recording medium is loaded onto medium driving means for driving said recording medium, and medium discriminating means for monitoring an output of said medium insertion detecting means, and discriminating whether a recording medium loaded onto said medium driving means is a new one or a previously loaded recording medium which has remained inserted.

2. A medium replaceable recording and reproducing apparatus comprising:

medium insertion detecting means for detecting that at least a part of a recording medium is inserted into a recording and reproducing apparatus of said recording medium, drive-means loading detecting means for detecting that said recording medium is loaded onto medium driving means for driving said recording medium, medium discriminating means for monitoring an output of said medium insertion detecting means, and discriminating whether a recording medium loaded onto said medium driving means is a new one or a previously loaded recording medium which has remained inserted, and operation control means for executing the subsequent due process while omitting a part of the process for initializing said apparatus whenever said medium discriminating means determines that the previously loaded recording medium has remained inserted.

3. A medium replaceable recording and reproducing apparatus according to claim 2, wherein:

said operation control means omits, as said part of the process for initializing said apparatus, the process of setting internal parameters of said apparatus corresponding to a loaded medium.

4. A medium replaceable recording and reproducing apparatus according to claim 3, wherein:

an optical disk is used as said recording medium, and said operation control means omits the process of setting at least one of laser reproducing power, laser recording power, laser erasing power, disk rotational speed, and data exchange information as said internal parameters of said apparatus corresponding to a medium.

5. A medium replaceable recording and reproducing apparatus according to claim 2, wherein:

said medium discriminating means determines that a previously loaded recording medium is reloaded onto said medium driving means, in the case that an inserted condition of said recording medium is continuously detected by said medium insertion detecting means even if an unloaded condition of said recording medium is once detected by said drive means loading detecting means.

6. A medium replaceable recording and reproducing apparatus according to claim 2, wherein:

said medium discriminating means determines that previously loaded recording medium is reloaded onto said medium driving means, in the case that an inserted condition of said recording medium is continuously detected by said medium insertion detecting means even if an unloaded condition of said recording medium is once detected by said drive means loading detecting means, or even if a non-inserted condition of said recording medium is temporarily detected by said medium insertion detecting means for a predetermined short period of time which is not long enough to replace a recording medium.

7. A medium replaceable recording and reproducing apparatus according to claim 2, wherein:

upon receiving an operation command for at least one of recording, reproducing and erasing from external host control means, said operation control means executes the process corresponding to said operation command while omitting a part of the process for initializing said apparatus, when the previously loaded recording medium is reloaded and the process for initializing said apparatus is completed.

8. A medium replaceable recording and reproducing apparatus according to claim 2, wherein:

in a case that said medium driving means is stopped when any operation command is not input from external host control means for a predetermined period of time, upon receiving an operation command for at least one of recording, reproducing and erasing from external host control means after stoppage of said medium driving means, said operation control means executes the process corresponding to said operation command while omitting a part of the process for initializing said apparatus, when the previously loaded recording medium is reloaded and the process for initializing said apparatus is completed.

9. A medium replaceable recording and reproducing apparatus according to claim 2, further comprising:

a control unit which includes said medium discriminating means and said operation control means, is connected to external host control means for executing operation commands and transmission/reception of data, and discriminates a loaded recording medium for making control of the process for initializing said apparatus and control of operations including recording and reproducing.

10. A medium replaceable recording and reproducing apparatus according to claim 2, further comprising:

first control unit which includes said operation control means, is connected to external host control means for executing operation commands and transmission/reception of data, and provides control of operations including recording and reproducing, and a second control unit which includes said medium discriminating means, discriminates a loaded recording medium and delivers a discrimination result to said first control unit, and provides control of the process for initializing said apparatus, and wherein said operation commands and request signals are transferred between said first control unit and said second control unit.

11. A medium replaceable recording and reproducing apparatus according to claim 1, wherein:

said medium insertion detecting means is disposed near an innermost end of a recording medium holder.

12. A medium replaceable recording and reproducing apparatus according to claim 1, wherein:

said medium insertion detecting means is disposed near an insertion opening of a recording medium holder.

* * * * *